US006735549B2

(12) United States Patent
Ridolfo (10) Patent No.: US 6,735,549 B2
(45) Date of Patent: May 11, 2004

(54) PREDICTIVE MAINTENANCE DISPLAY SYSTEM (75) Inventor: Charles F. Ridolfo, Bloomfield, CT (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 440 days.

(21) Appl. No.: 09/819,837

(22) Filed: Mar. 28, 2001

(65) Prior Publication Data

US 2003/0216888 A1 Nov. 20, 2003

(51) Int. Cl.[7] .............................................. G06F 15/00
(52) U.S. Cl. ........................................ 702/181; 701/29
(58) Field of Search ........................ 702/34–36, 81–84, 702/113–115, 179–185, 187, 188, FOR 124, FOR 126, FOR 137, FOR 139, FOR 170; 701/29, 30, 63; 705/8, 9; 706/56

(56) References Cited

U.S. PATENT DOCUMENTS

| | | | |
|---|---|---|---|
| 4,884,054 A | * 11/1989 | Moon, Sr. .............. 340/309.15 |
| 5,132,920 A | 7/1992 | Bellows et al. |
| 5,210,704 A | 5/1993 | Husseiny |
| 5,231,594 A | * 7/1993 | Knibiehler et al. ......... 702/177 |
| 5,608,845 A | 3/1997 | Ohtsuka et al. |
| 5,852,793 A | * 12/1998 | Board et al. .................. 702/56 |
| 6,006,171 A | * 12/1999 | Vines et al. ................. 702/184 |
| 6,226,597 B1 | * 5/2001 | Eastman et al. .............. 702/34 |
| 6,243,628 B1 | * 6/2001 | Bliley et al. ................ 702/189 |
| 6,405,108 B1 | * 6/2002 | Patel et al. ................... 701/29 |
| 6,453,279 B1 | * 9/2002 | Prasad et al. ............... 702/189 |

FOREIGN PATENT DOCUMENTS

| | | |
|---|---|---|
| EP | 0 509 817 A1 | 10/1992 |
| EP | 0 612 039 A2 | 8/1994 |
| EP | 0 908 805 A1 | 4/1999 |
| EP | 1 069 487 A1 | 1/2001 |

* cited by examiner

Primary Examiner—Marc S. Hoff
Assistant Examiner—Mohamed Charioui (57) ABSTRACT

A display system in which subsequent failures of plant equipment and plant systems are predicted to occur and in which the probability of failure before a specified date and the probability of failure after a specified date is determined and displayed and in which the calendar date is determined and displayed when the desired probability that the equipment not fail prior to the calendar date is specified. The system includes an Equipment Failure And Degradation Module that determines the remaining equipment/system life; a Probability-of-Failure Predictor Module that determines the probability of the equipment/system failing prior to a specified date and the probability of the equipment/system failing after a specified date; and a Date-of-Failure Predictor Module that determines the calendar date that corresponds to a specified probability that equipment not fail prior to the date.

10 Claims, 8 Drawing Sheets

PREDICTIVE MAINTENANCE DISPLAY SYSTEM

BACKGROUND OF THE INVENTION

1. Field of the Invention

This invention relates generally to process monitoring display systems and more particularly to predictive maintenance display systems that determine, with a measure of specificity, the date on which components should be serviced to avoid the likelihood that they will fail during operation.

2. Related Art

Many industries, such as the power generation industry, have experienced an increased awareness of and emphasis on the benefits and use of predictive maintenance technologies. Use of such technologies has the potential to improve the long-term availability and reliability of plant components resulting in an overall improvement to plant operability.

Predictive maintenance methodologies currently utilize a variety of techniques in order to predict subsequent equipment and system failures. With the present state of the art, the predicted failures that are based on time remaining to failure are typically depicted in terms of the future point in time in which the failure will likely occur along with a corresponding confidence interval. A typical representative prediction can be stated as:

Predicted failure point: 2000 hours (+/−500 hours with a 95% confidence interval).

The above example indicates that the system is predicted to fail within 2000 hours from now (mean-time-to-failure). It further indicates that failure will occur between 1500 and 2500 hours from now with a 95% confidence (that is, 95 out of 100 times the failure will occur between 1500 and 2500 hours from now, and 5 out of 100 times the failure will occur for times outside this range).

However, such predictions contain a number of deficiencies, for example:

1. The predicted failure range is often too wide and thus, it becomes difficult to efficiently and cost effectively schedule maintenance in advance of the predicted failure.
2. Operations and maintenance personnel are often misled by predictions of failure in which a failure interval is given (as illustrated above). An implicit assumption is often made that since equipment failure can occur anywhere within the predicted interval, that it is better to wait until the end of the interval in order to obtain additional operating life from the equipment and not replace the equipment prematurely. However, this logic is faulty because the probability of failure is based on a continuous increasing probability continuum. Thus, the probability that the equipment will fail in service before the predicted mean-time-to-failure is low for a time interval that occurs near the beginning of the predicted interval. However, the probability that the equipment will fail in service before the predicted mean-time-to-failure is high for a time interval that occurs near the end of the predicted interval.

Figure 1:
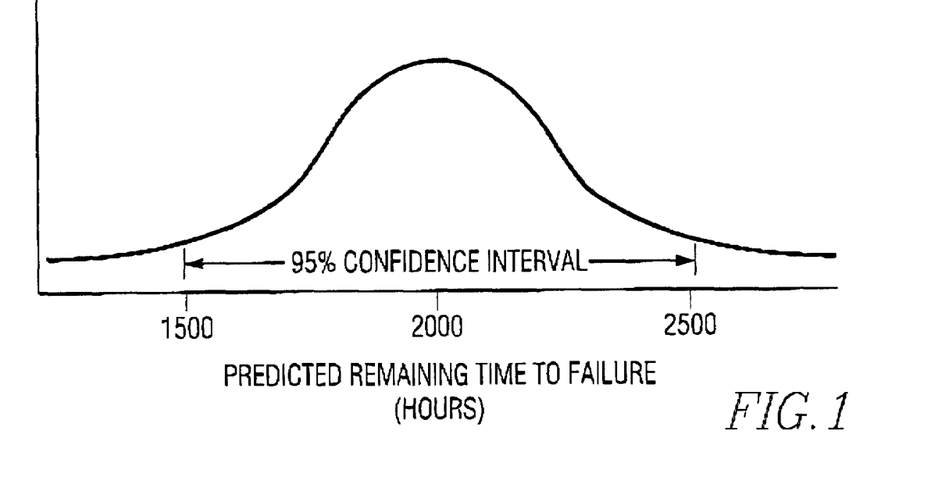
FIG. 1 is a graphical illustration of a Normal Distribution with a 95% confidence interval of a predicted remaining time to failure.

As an illustration, considering the example noted above and referring to FIG. 1, assume the equipment failure prediction conforms to a Normal Distribution, and assume it is desired to refurbish/replace the equipment prior to experiencing an "in-service" failure, then:

At 1500 hours, the probability that the equipment will fail "in-service" (prior to the 1500 hour point) will be only 2.5% (another way of stating this is that there is a 97.5% probability that the equipment will fail after 1500 hours). Thus, if a decision is made to perform maintenance on the equipment at the 1500-hour point, there is only a 2.5% chance that the equipment will fail in-service, prior to the 1500-hour point. Therefore, it is highly likely that the equipment can be successfully refurbished/replaced prior to the occurrence of an "in-service" failure.

At 2500 hours, the probability that the equipment will fail "in-service" (prior to 2500 hours) will be 97.5% (another way of stating this is that there is a 2.5% probability that the equipment will fail after 2500 hours). Thus, if a decision is made to perform maintenance on the equipment at the 2500 hour point, there is a very significant 97.5% chance that the equipment will fail "in-service," prior to the 2500 hour point. Therefore, it is highly unlikely that the equipment can be successfully refurbished/replaced prior to the occurrence of an "in-service" failure.

Such information, on the probability of equipment failing prior to a selected maintenance date, is unavailable based on current predictive maintenance display methodologies, and represents a significant shortcoming with the current methodologies.

3. Simply providing the expected interval in which the failure is likely to occur does not alone provide maintenance and operational personnel sufficiently detailed information on the probability of failure from any specific point in time within the predicted failure interval. Because failure predictions are based on a continuous increasing probability continuum, there is wide variance on the probability of failure from anywhere within the expected failure interval. In order to efficiently accommodate and plan for future equipment and system failures, the maintenance and operational personnel require the specific probability of equipment/system failure from any point within a predicted failure interval.

4. Currently, the capability for operators and maintenance personnel to perform interactive "what if" scenarios based on future points in time, does not exist. Such capability will allow personnel to explore various maintenance scheduling alternatives, by determining what the specific probability of equipment failure will be for any future point in time. By obtaining the specific probability of failure on a given date, the operations and maintenance personnel can explore "what if" scenarios to better decide when to schedule refurbishment/repair activities. Providing such capability will allow operators and maintenance personnel to fully explore the probability continuum and optimize maintenance and scheduling activities.

5. Currently, the capability for operators and maintenance personnel to perform interactive "what if" scenarios based on the desired probability of equipment failing before a calendar date, does not exist. Such capability will allow personnel to explore various maintenance scheduling alternatives, by determining what calendar date corresponds to a specified probability of equipment failing prior to the calendar date. By obtaining the calendar date for a specified probability of failure prior to the calendar date, the operations and maintenance personnel can explore "what if" scenarios to better decide when to schedule refurbishment/repair activities. Providing such capability will allow operators and maintenance personnel to fully explore the probability continuum and further optimize maintenance and scheduling activities.

SUMMARY OF THE INVENTION

Accordingly, it is an object of this invention to provide a predictive maintenance display system that will identify the specific probability of failure of a monitored component for any given date inputted by plant personnel. Additionally, it is a further object of this invention to provide such a display system that will identify the date a monitored component is not likely to fail on or before for a given probability inputted by plant personnel.

These and other objects are achieved by this invention which includes an Equipment Failure And Degradation Module that determines the remaining equipment/system life from measurements taken from plant sensors that monitor various components and subcomponents in a plant. Preferably, various methodologies are utilized by the Equipment Failure And Degradation Module to ascertain the potential of incipient equipment failures and to predict the equipment remaining life, to best fit the methodology to the component monitored. Examples of these methodologies include trend analysis, pattern recognition, correlation techniques, limits and ranges, data comparison, and statistical process analysis. The predictive maintenance algorithms utilized by the Equipment Failure And Degradation Module will employ a variety of the aforementioned techniques that best suit the equipment or system that is being analyzed. The foregoing methodologies can be applied by the Equipment Failure And Degradation Module with a number of analytical operations to predict the remaining life of the monitored components, e.g., vibration analysis, temperature measurements, flow measurements, valve analysis, electrical analysis, thickness measurement analysis, efficiency analysis, and analysis of position and alignment. Predictions of subsequent equipment failures, as determined by the Equipment Failure And Degradation Module, are fitted to appropriate normalized statistical models.

The invention also provides a Probability-of-Failure Predictor Module that determines the probability of the equipment/system failing prior to a specified date utilizing the statistical models generated by the Equipment Failure And Degradation Module. Preferably, the Probability-of-Failure Predictor Module also determines for a specified date the probability that a failure will occur after the specified date.

The invention additionally provides a Date-of-Failure Predictor Module that determines the calendar date that corresponds to a specified probability that equipment not fail prior to the date. The Date-of-Failure Predictor Module also operates on the derived statistical models generated by the Equipment Failure And Degradation Module.

For certain equipment, components or systems which are composed of subunits or sub-systems (hereafter at times referred to as subcomponents) the failure of the equipment, components or systems may be dependent upon the logically combined probability of failure of the subcomponents which comprise the subject equipment, component, or system. For such cases, the overall probability of failure is logically derived based upon the individual failure contributions of the constituent elements which are monitored.

BRIEF DESCRIPTION OF THE DRAWINGS

The invention will be more fully understood from the description of the preferred embodiment with reference to the accompanying drawings, in which.

DESCRIPTION OF THE PREFERRED EMBODIMENT

Figure 2:
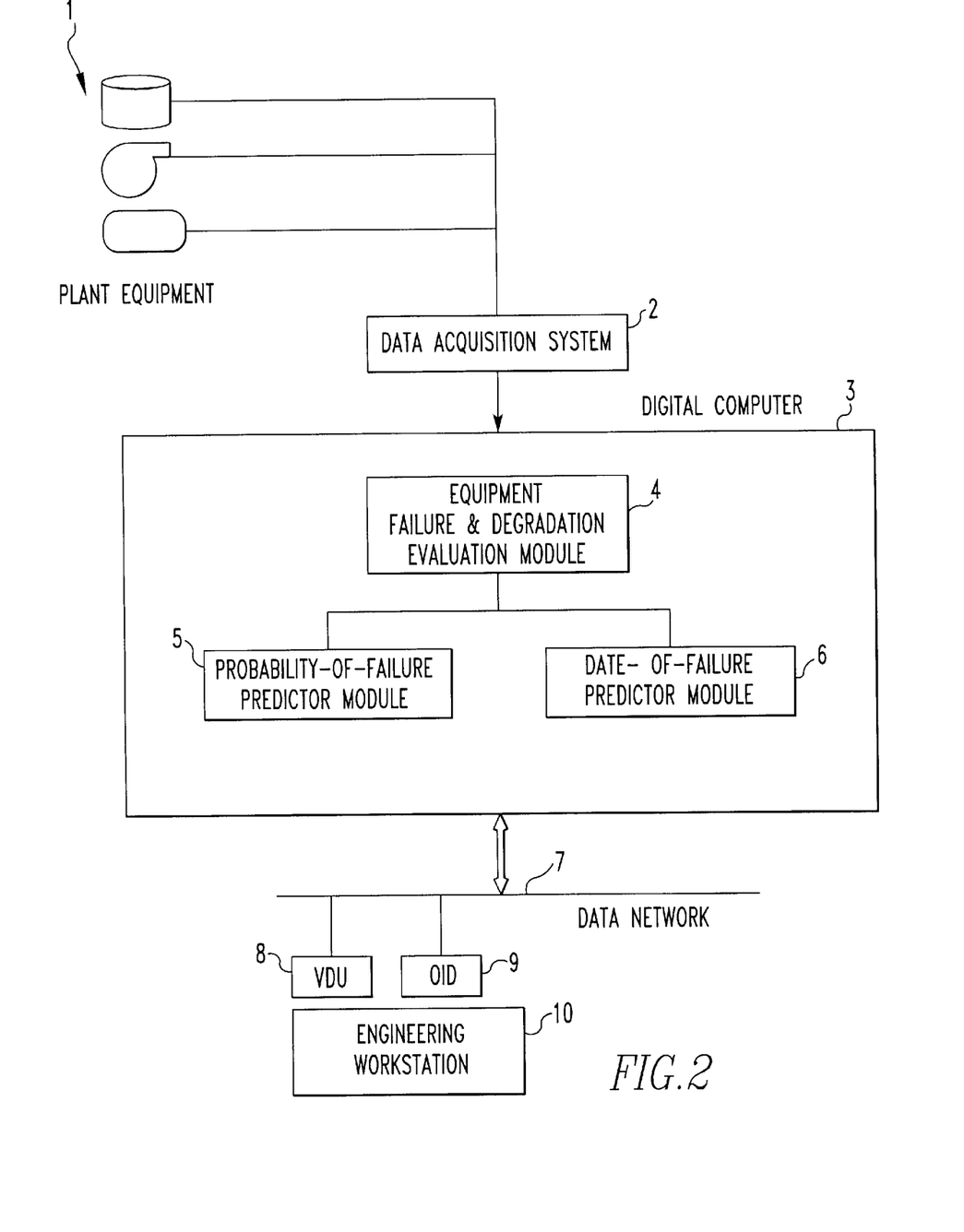
FIG. 2 is a schematic representation of the predictive maintenance display system components of this invention.

More and more sophisticated processes whose continuous operation is important to the industries that they serve, are employing smart components that use sensors to monitor characteristics indicative of their operating condition. An example can be found in the nuclear electric generating industry wherein component failures can force an unplanned outage, which is extremely expensive. The Nuclear Energy Research Initiative of the United States Department of Energy has a smart equipment program that has among its objectives to identify and prioritize nuclear plant equipment that would most likely benefit from smart monitoring features; develop a methodology for systematically monitoring the health of the individual pieces of equipment implemented with smart features; and develop a methodology to provide plant operators with real time information through smart equipment man/machine interfaces to support decision-making. While this invention was not conceived under that program, it is directed towards the latter objective. FIG. 2 provides a diagrammatic illustration of a preferred embodiment of the predictive maintenance display system of this invention. Sensors 1, located on plant equipment, record plant and plant process parameters (such as temperatures, flow rates, pressures, radiation levels, valve positions, pump rotation speeds, vibration levels, acoustic signatures, etc.). These sensors interface with a data acquisition system 2 that transmits the acquired sensor data to a digital computer 3. Video display units (VDU) 8 located at engineering workstations 10, are used to present predictive maintenance information to the operators and maintenance personnel. Operator input devices (OID) 9 are also located at each engineering workstation 10 and allow the plant staff to interface with the digital computer 3 as further discussed below. The OID 9 may be a track ball, computer mouse, VDU touch-screen, finger pad, keyboard, keypad, etc.

There are three major components of the predictive maintenance display system of this invention which are contained within the digital computer 3: the Equipment Failure And Degradation Module 4; the Probability-of-Failure Predictor Module 5; and the Date-of-Failure Predictor Module 6. These components interface with the video display units 8 and operator interface devices 9 located at the engineering workstations 10 via a data network 7.

Equipment Failure and Degradation Module

The Equipment Failure And Degradation Module 4 within the Digital Computer 3 determines if any equipment is in imminent danger of failing and determines the predicted remaining equipment life until the equipment must be repaired, refurbished, or replaced. Predictions of future failures are fitted to normalized statistical models (such as a Normal Distribution or other suitable distribution).

To perform its incipient failure detection and predictive maintenance function, the Equipment Failure And Degradation Module 4 periodically and/or continuously (as appropriate) acquires the requisite component and/or process measurements from the plant sensors 1 and performs the necessary data processing on the collected data set. Due to the wide variety of equipment and plant processes that exist within a plant, a variety of techniques are utilized to ascertain the potential of incipient equipment failures and to predict the equipment remaining life.

The following are typical of the methodologies that are utilized by the Equipment Failure And Degradation Module 4 to ascertain the potential of incipient equipment failures and to predict the equipment remaining life:

Trend Analysis

Trend analysis is used to assess equipment health and degradation by monitoring for changes in selected measurement parameters over time. The trended information may be in either the time domain (such as absolute vibration level tracked against time) or in the frequency domain (such as vibration amplitude over a frequency spectrum which is monitored—in this case significant increases/changes in amplitude at various frequencies are tracked in time).

To perform trend analysis, parameters to be trended are first identified, the trend periodicity to be utilized is then defined, and alert/warning criteria for early identification of impending problems are finally developed. Typically, the equipment manufacturers' recommendations and industry experience are used to develop alert/alarm criteria. Statistical methods are utilized to enhance the trend accuracy.

Pattern Recognition

Pattern Recognition techniques are utilized to assess equipment health and degradation by analyzing the selected measurement parameters relative to state or status patterns. Statistical methods are used to improve pattern recognition accuracy. Techniques such as Time Source Analysis and Fast Fourier Transform are typically used to process the data in conjunction with pattern recognition algorithms.

Correlation Techniques

Related sets of data may be correlated to assist in performing predictive analysis. Correlation coefficients are developed to aid in the recognition of patterns or the recognition of sequences of events that are related.

Limits and Ranges

Component monitoring may utilize alarm/alert limits using thresholds, bands and frequency filters. This approach allows subsequently gathered information to be compared to expected regions of operation for the monitored components.

Data Comparison

Several comparative methods may be utilized for preventative maintenance data analyses. Data for a particular system or component can be compared to standard values, manufacturers' recommendations, technical specifications, code limits, or normal baseline data or ranges. Data may be compared on an absolute basis or a relative basis.

As an example, data from a specific component may be analyzed to identify discontinuities (breaks) in a performance curve, or data trends, or data offsets. In addition, data on similar components can be compared to develop comparison data relative to similar components. This comparison of data is used to assess equipment or system health and aging.

Statistical Process Analysis

Statistical methods are used extensively in the analysis of PMP (Predictive Maintenance Plant) data. Techniques, such as curve fitting, data smoothing, predictive techniques and probabilistic inference techniques (such as Bayesian Belief Networks), and mean standard deviation are extensively being used.

The predictive maintenance algorithms utilized by the Equipment Failure and Degradation Module 4 will employ a variety of the aforementioned methodologies, depending on the equipment or system that is being analyzed. The following describes a number of the predictive maintenance analysis applications that are employed by the Equipment Failure and Degradation Module 4 to predict remaining equipment life.

Vibration Analysis

Vibration analysis is utilized to determine the health and useful remaining service life of critical equipment and components in the Nuclear Island (NI) as well as for suitable Balance of Plant (BOP) components. Vibration detectors transmit vibration information associated with steady state operation and other operating regimes, such as equipment startup, coast-down and breakaway analyses can be used to enhance the capabilities of the predictive program to detect incipient failures. The remaining equipment life is inferred from vibration frequency analysis by trending amplitude changes in the spectrum over time.

Equipment transient analysis techniques (for startup, coast down and breakaway conditions) include vibration spectral data as a function of machine speed. These analyses are utilized to determine the presence of equipment structural response frequencies as they are excited during the equipment transients (such as startup and coast down). Trending, comparative analysis and signature frequency analysis techniques are utilized to detect indications of component degradation and to predict remaining component useful life.

Temperature Measurement

Indications of incipient mechanical and electrical problems can often be determined by the presence of excessive heat generation or by the absence of suitable heat output. Temperature measurement technologies, such as contact pyrometry and thermography are used by the Equipment Failure and Degradation Module 4 to support predictive maintenance applications. Measurements obtained via infrared thermography and contact pyrometry are used to determine the remaining life of electrical switch gear, motor control centers, and transformers. The remaining life of electrical connections, insulation, and of equipment that is experiencing friction induced heating is also inferred by monitoring heat generation.

Flow Measurement of Liquids

For certain equipment and systems, flow change is an indicator of impending component failure and of remaining equipment life. Existing process monitoring instrumentation can usually be utilized for the requisite data measurements. Flow measurement is typically collected for trending, and for correlation predictive analysis.

Valve Analysis

The Equipment Failure and Degradation Module 4 module predicts potential failures, degradations and remaining life for valves by analysis of valve and switch timing, number of operational cycles, and trending in-service valve test results.

Valve operator types will include air, motor, hydraulic and solenoid.

Electrical Analysis

Electrical measurement analysis is used to determine the health and to predict the remaining useful service life for electrical motors, breakers, switches, cables, transformers, controllers, and cables. The following types of analysis techniques are applied to such equipment as appropriate: motor current signature analysis, contact resistance measurements, breaker closing time, voltage drop, and circuit ground resistance.

Infrared thermography capability is also used to collect heat generation data, which can provide additional indications of impending equipment failure or reduction in service life. In addition, ultrasonic monitoring is also used for detection of Corona discharge activity in transformers.

Methodologies utilized for early detection of electrical component degradation include trending, comparative analysis, and signature frequency analysis.

Thickness Measurement Analysis

For certain plant equipment and components (such as associated piping), thickness measurement is used to provide an indication of equipment integrity and its remaining useful service life. Thickness measurement sensors (such as ultrasonic sensors) are utilized to determine the degree of wear, erosion, and corrosion that has occurred and to predict the remaining useful life of the equipment.

Trending and correlation analysis techniques are typically used for analysis and predictive purposes.

Efficiency Analysis

The calculation and tracking of equipment efficiency is used for indications of degrading performance and impending failures. Operational efficiency are determined for appropriate equipment, components, and systems utilizing suitable measurements.

Trending and correlation analysis is applied to note changes in operational efficiency and predict when operation no longer becomes cost-effective or when equipment replacement is advisable.

Examples of efficiency analysis include determining the efficiency for heat transfer processes for applicable equipment and systems. Changes in efficiency serve as an indication of equipment degradation, fouling, or subsystem failures.

Analysis of Position and Alignment

For some equipment and components, position/alignment measurements serve as an indicator of equipment integrity and an indication of remaining useful service life. Position/alignment measurements from plant sensors are used to determine the degree of misalignment and to track the change in misalignment over time.

Trending and correlation analysis techniques are used for analysis and predictive purposes.

Predictions of subsequent equipment failures, as determined by the Equipment Failure and Degradation Module 4, are fitted to appropriate normalized statistical models (such as a Normal Distribution; or other suitable distributions as applicable), for subsequent operation by the Probability-of-Failure Predictor Module 5 and the Date-of-Failure Predictor Module 6. Due to the variety of plant equipment, components, and systems, and due to the variety of predictive failure methodologies; a variety of statistical models may be utilized by the Equipment Failure and Degradation Module 4. For some equipment, components, or systems, a theoretical or idealized statistical model may be utilized. The statistical models are based on variety of factors including: previous operational experience with similar equipment, vendor information, theoretical considerations, industrial data bases, research programs, test rig data, etc.

Probability-of-Failure Predictor Module

The Probability-of-Failure Predictor Module 5 within the Digital Computer 3 determines, for a specified date, the probability that a failure will occur prior to the specified date and the probability that a failure will occur after the specified date. This allows the plant staff to fully explore the probability continuum.

The Probability-of-Failure Predictor Module 5 operates on the derived (or defined) statistical models as generated by the Equipment Failure and Degradation Module 4. For certain equipment, components, or systems which are composed of sub-units or sub-systems, the failure of the equipment, component, or system may be dependent upon the logically combined probability of failure of the sub-units or sub-systems which comprise the subject equipment, component, or system. For such cases, the overall probability of failure must be logically derived based upon the individual failure contributions of the constituent elements.

Prior to describing the requisite logic for the Probability-of-Failure Predictor Module 5, a brief discussion of the applicable logic is a helpful prerequisite in order to follow the subsequent algorithmic descriptions. For illustrative purposes and by way of example only, the description is based on a system which is composed of three sub-systems. The three sub-systems are independent and the failure modes for each sub-system are independent. For such a system, each of the individual constituent sub-systems will have a separate probability of failure as determined by the Equipment Failure and Degradation Module 4. These individual probabilities of failure are based on statistical models and can be represented as follows:

$$P_1 = \int_0^{\tau_1} f_1(t)$$

$$P_2 = \int_0^{\tau_1} f_2(t)$$

$$P_3 = \int_0^{\tau_1} f_3(t)$$

Figure 3:
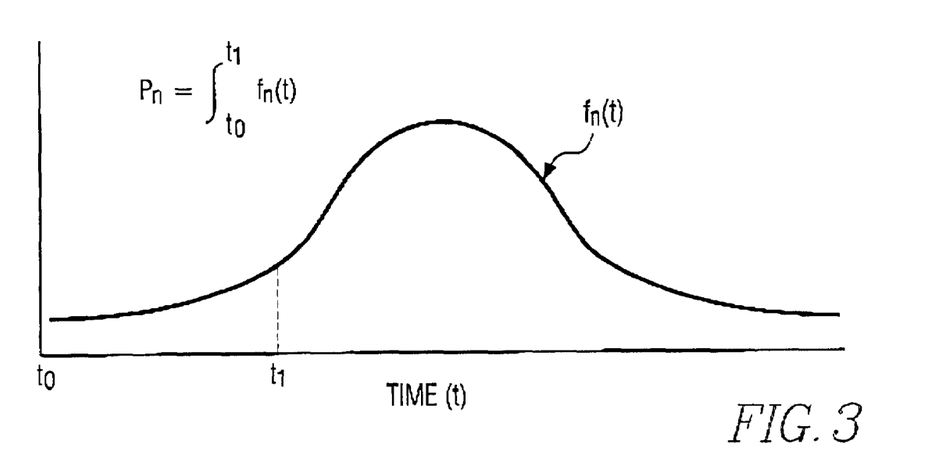
FIG. 3 is a graphical illustration of an exemplary statistical model of failure distribution.

Where:
$f_n(t)$ is a statistical model for the failure distribution for sub-system "n" as a function of time (where time is such that $t=t_0$ represents the time which corresponds to a defined starting point for the failure distribution function (where $f_n(t)$ begins and is essentially zero), and $t=t_1$ represents a point in time greater than $t_0$ $[t_1>t_0]$). FIG. 3 illustrates a representative model of such a failure distribution (based on a Normal Distribution—other types of distributions may also be valid depending on the component).

$P_n$ is the probability of failure for sub-system "n" at time $t=t_1$.

For such a system, since the probability of failure of each sub-system is independent, the overall probability of failure for the entire system ($P_{system}$) can be computed as follows:

$$P_{system}=P_1+P_2+P_3-(P_1P_2+P_1P_3+P_2P_3-P_1P_2P_3) \quad (1)$$

Similar computational logic can be derived for systems with a different number of constituent sub-elements or for systems that contain constituent sub-elements which contain conditional probability dependencies; using standard statistical methods.

Figure 4:
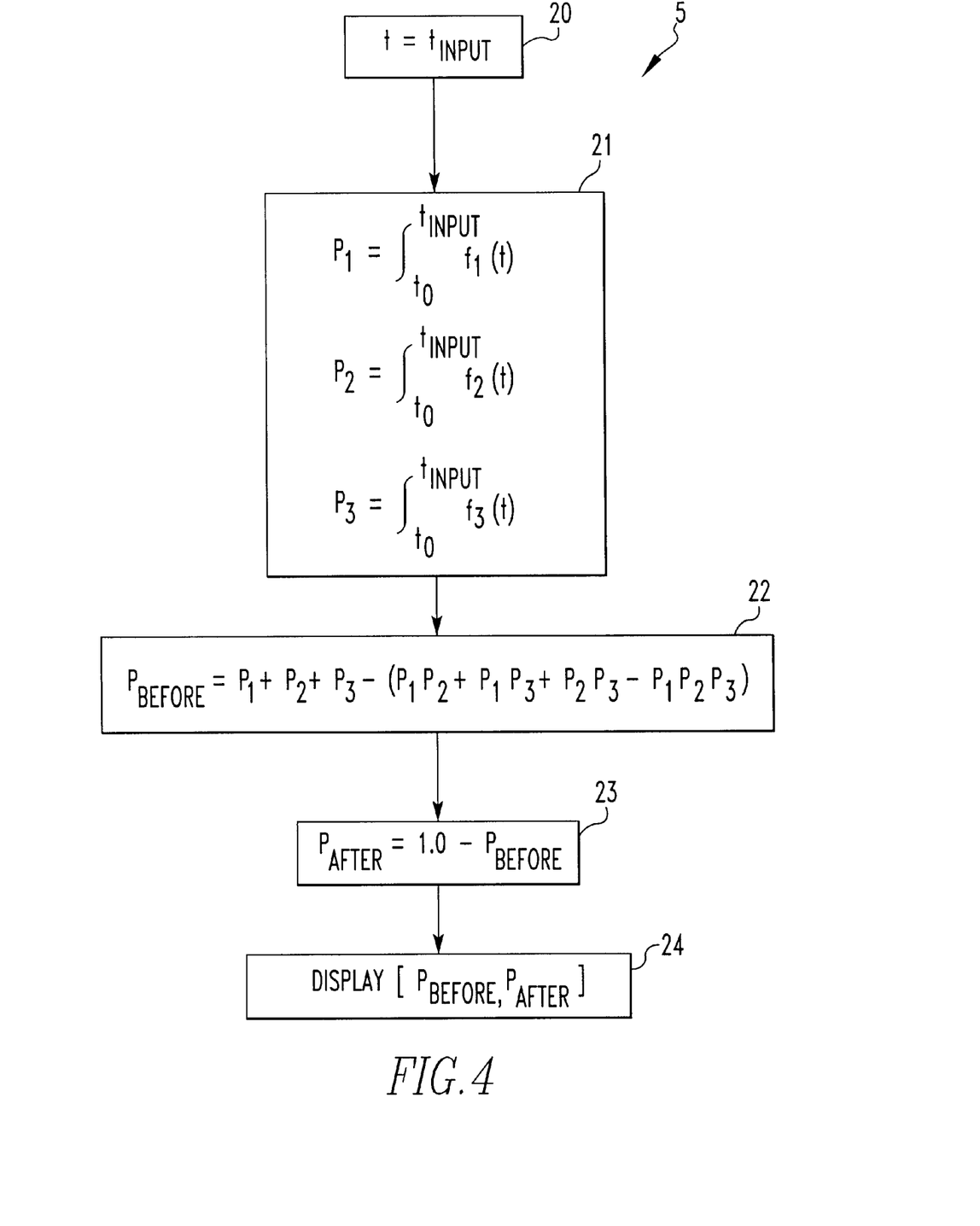
FIG. 4 is a flow diagram illustrative of the probability analysis of the Probability-of-Failure Predictor Module of this invention.
Figure 5:
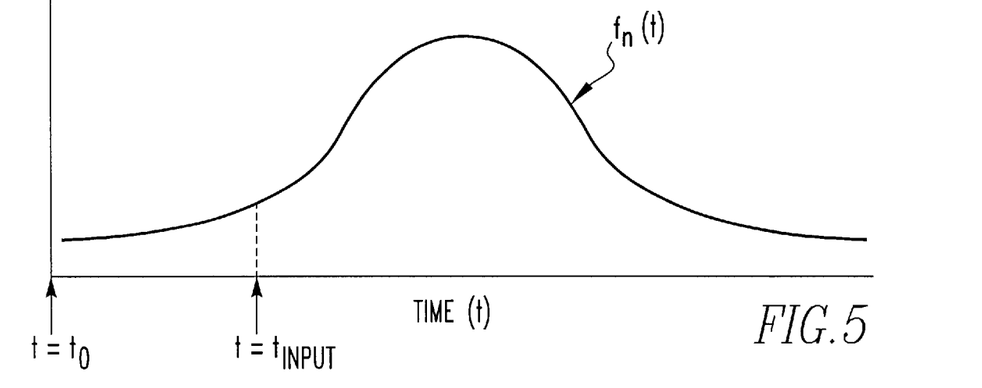
FIG. 5 is a graphical illustration of a statistical model used to compute the probability of failure.

FIG. 4 provides a flowchart representation of the Probability-of-Failure Predictor Module 5 (illustrated for the case of a system comprised of 3 sub-systems, as previously discussed). Via the VDU 8 and the OID 9 (see FIG. 2) the plant operator or maintenance personnel enters a future date of interest ($t_{input}$). Box 20 sets time (t) to the specified time ($t_{input}$) as entered by the plant personnel. Box 21 calculates the probability of failure for each of the constituent sub-systems, at time=$t_{input}$. This is computed by using the left hand region of each of the sub-system probability distributions (see FIG. 5). Standard numerical integration techniques are utilized to compute the area defined by the probability distribution between time $t=t_0$ and $t=t_{input}$. Box 22 determines the overall probability of failure for the system before the specified date ($P_{before}$) using equation (1). Box 23 determines the overall probability of failure for the system after the specified date ($P_{after}$). Box 24 displays the computer values for $P_{before}$ and $P_{after}$.

Figure 6:
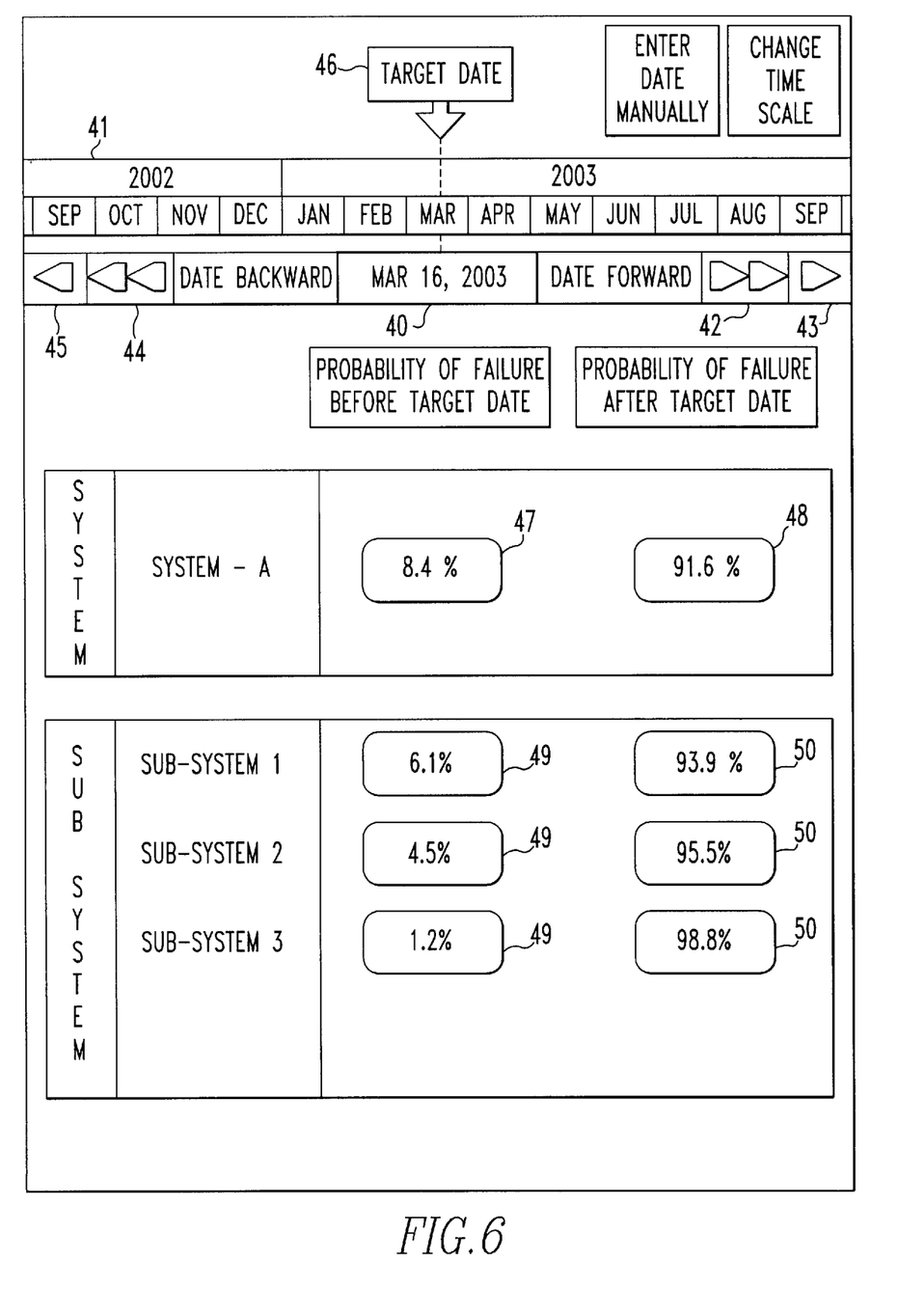
FIG. 6 is a schematic illustration of the interactive failure predictor display of this invention.

FIG. 6 illustrates the interactive display associated with the Probability-of-Failure Predictor Module (Interactive Failure Predictor Display) which is displayed on the VDU (item 8 of FIG. 2). The plant staff may enter a calendar date (Target Date) using two convenient methods. For the first method the operator directly enters the date directly using an appropriate OID device such as a keyboard or keypad (item 9 of FIG. 2). The date 40 is identified in FIG. 6 via the example date notation of "MAR 16, 2003". For the second method, the display incorporates a Calendar Representation Strip 41 in the upper display region. The calendar may be scrolled forward in time or backward in time using the Date Forward and Date Backward icons. Icons for Fast 42 and Slow 43 forward date scrolling are provided and icons for Fast 44 and Slow 45 backward date scrolling are provided. To scroll in time, the operator designates the appropriate date scroll icon with a suitable OID device, such as a trackball (item 9 of FIG. 2), and then activates it. While activated, the Calendar Representation Strip 41 laterally scrolls in the desired direction (Date Forward or Date Backward) and scrolls at the designated rate (Fast or Slow). The date which is sensed by the Predictor Display is indicated via the "Target Date" line 46 and is displayed below the "Target Date" line 40. For a specified date, the probability that the overall system will fail prior to this date 47 is displayed and the probability that the overall system will fail after this date 48 is displayed. In addition, for each constituent sub-system, the probability that the sub-system will fail prior to this date 49 is displayed and the probability that the sub-system will fail after this date 50 is displayed.

Figure 7:
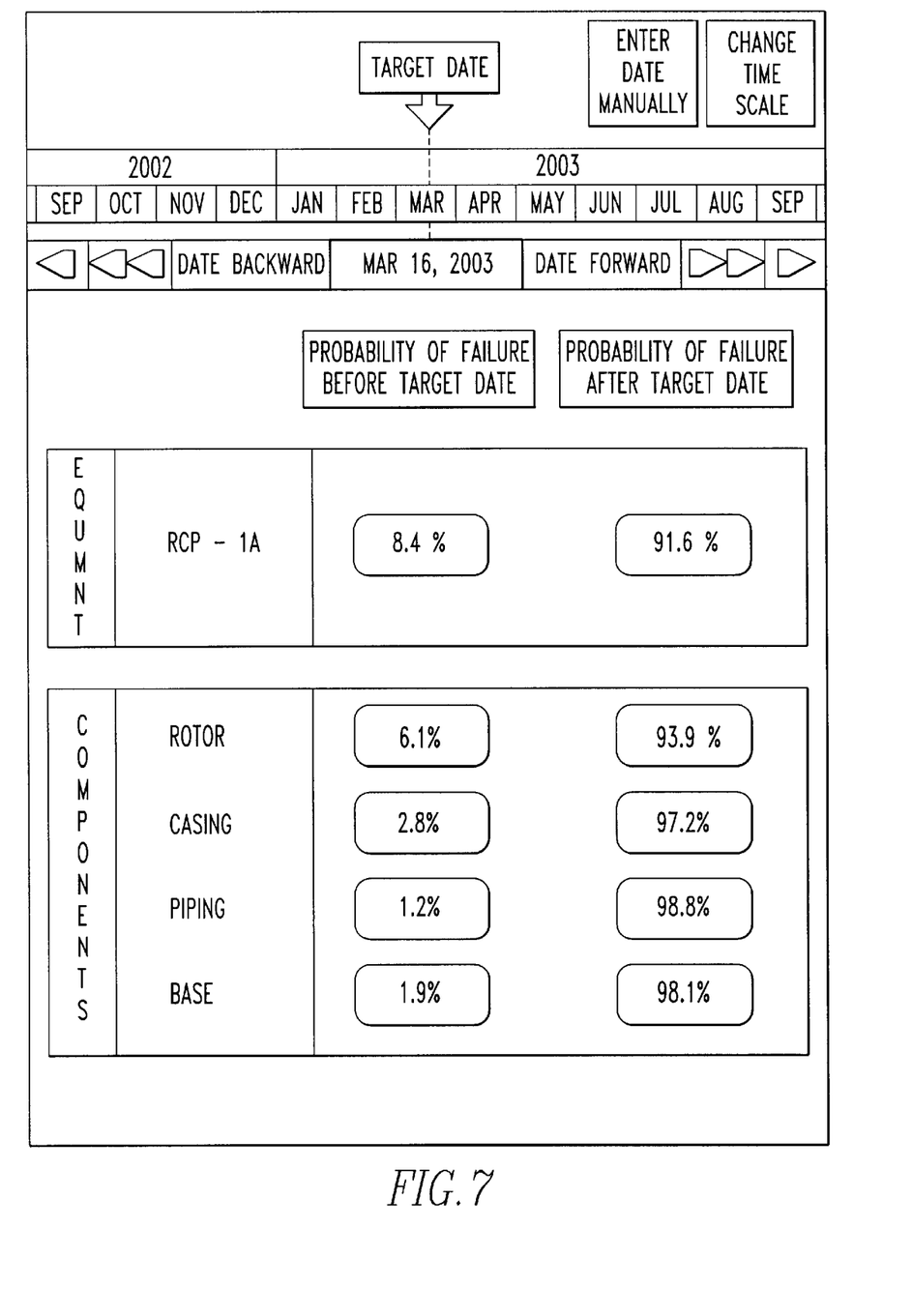
FIG. 7 is a schematic illustration of an interactive failure predictor display illustrating plant equipment composed of four constituent elements.

FIG. 7 illustrates another implementation of the Interactive Predictor Display for plant equipment (a Reactor Coolant Pump—RCP 1A) which is comprised of 4 constituent sub-elements. Each of the indicated sub-elements contributes to the overall probability of pump failure.

Date-of-Failure Predictor Module

The Date-of-Failure Predictor Module 6 within the Digital Computer 3 determines the calendar date for a specific probability of failure prior to the calendar date. This allows the plant staff to fully explore the probability continuum from a different perspective than the Probability-of-Failure Predictor Module.

The Date-of-Failure Predictor Module 6 operates on the derived (or defined) statistical models as generated by the Equipment Failure and Degradation Module 4. For certain equipment, components, or systems which are composed of sub-units or sub-systems, the failure of the equipment, component, or system may be dependant upon the logically combined probability of failure of the sub-units or sub-systems which comprise the subject equipment, component, or system. For such cases, the overall probability of failure must be logically derived based uipon the individual failure contributions of the constituent elements. This was previously described within the discussion on the Probability-of-Failure Predictor Module.

Figure 8:
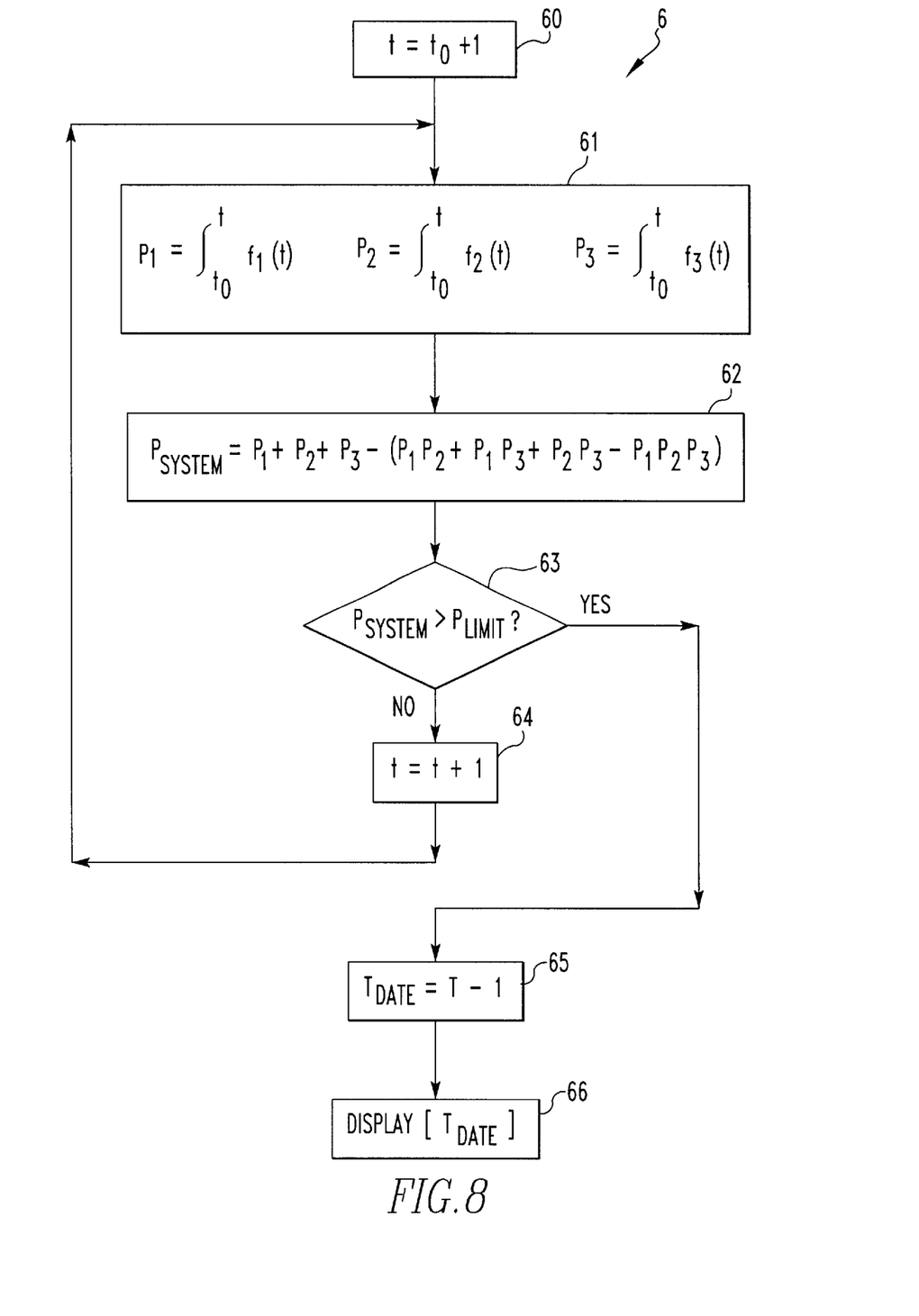
FIG. 8 is a flow diagram illustrating the probability analysis performed by the Date-of-Failure Predictor Module of this invention.
Figure 9:
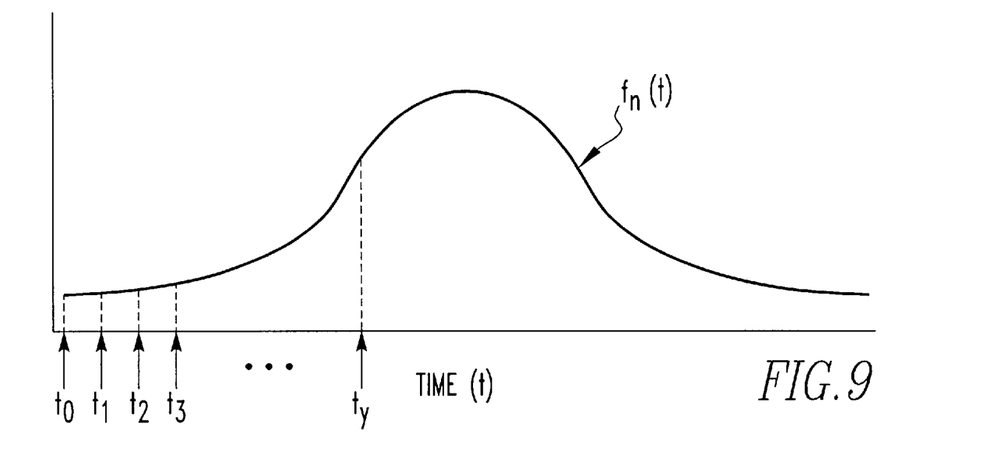
FIG. 9 is a graphical illustration of a statistical model that can be employed to compute the calendar date when the probability of a failure occurring prior to the calendar date is specified; and, FIG. 10 is a schematic illustration of the interactive predictor date display of this invention.

FIG. 8 provides a flowchart representaiton of the Date-of-Failure Predictor Module 6 (illustrated for the case of a system comprised of 3 sub-systems, as previously discussed). Via the VDU 8 and the OID 9 (see FIG. 2) the plant operator or maintenance personnel enter a probability of interest ($P_{limit}$). This corresponds to the probability that the system will fail prior to a corresponding calendar date. The Date-of-Failure Predictor Module 6 then determines the corresponding calendar date for this specified probability in an iterative manner. Box 60 sets time (t) to "$t_0$" plus one time iteration increment, $t=t_0+1$ (illustrated for a 1 day time iteration increment; where $t_0$ is the time at the defined starting point for $f_n(t)$, and where $t_0+1$ is one full day later). Box 61 calculates the probability of failure for each of the constituent sub-systems, at time $t_0+1$. Standard numerical integration techniques are utilized to compute the area defined by the probability distributions between time $t=t_0$ and time $t=t_0+1$. Box 62 determines the overall probability of failure for the system ($P_{system}$) at time $t=t_0+1$ using equation (1). Box 63 compares the computed overall probability of failure with the desired value ($P_{limit}$). If the value is less than the limit probability value ($P_{limit}$), then box 64 increments time by an appropriate amount (illustrated for a 1 day increment; $t=t+1$) and boxes 61 and 62 again compute the overall probability of failure for the system ($P_{system}$) for the new point in time. Standard numerical integration techniques are utilized to compute the area defined by the probability distributions between $t=t_0$ and $t=t_0+1$. Whenever box 63 determines that the computed overall probability of failure for the system ($P_{system}$) exceeds the desired value ($P_{limit}$), then the iterative loop (consisting of boxes 61, 62, 63 and 64) is terminated. Box 65 then decrements the accumulated time (t) by an appropriate amount (illustrated with a one day decrement period) so as to output a date in which the probability of failure for the overall system does not exceed the desired value ($P_{limit}$). Box 66 finally displays the desired calendar date ($T_{date}$). This interative algorithmic process is graphically depicted on FIG. 9.

Figure 10:
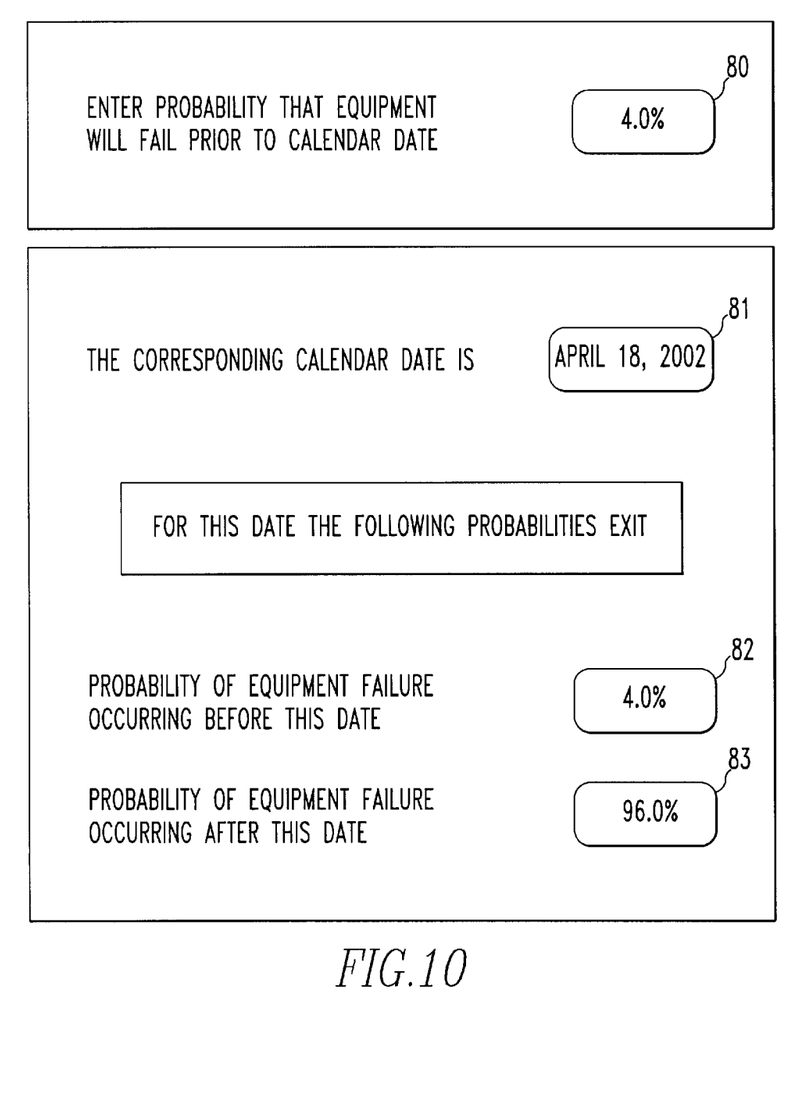

FIG. 10 illustrates the interactive display associated with the Date-of-Failure Module (Interactive Predictor Date Display) which is outputted on the VDU (item 8 of FIG. 2). The plant staff may enter a probability number 80, which corresponds to the probability of equipment failing prior to a calendar date, via an appropriate OID (item 9 of FIG. 2) such as a keyboard or keypad. The display outputs the calendar date 81 which corresponds to the entered probability, and also displays the probability that the overall system will fail prior to this date 82 (as originally specified/entered by the plant staff) and the probability that the overall system will fail after this date 83.

Accordingly, this invention provides a Probability-of-Failure Predictor Module that determines the probability of equipment failure occurring prior to any specified future date. For any specified date, the module determines the probability of the failure occurring prior to the specified date and the probability of the failure occurring after the specified date. By knowing the probability of failure that corresponds to the date, knowledgeable decisions can be made on how long to delay repairing, refurbishing, replacing equipment.

The invention also provides a Date-of-Failure Predictor Module that determines the calendar date which corresponds to a specified probability of failure occurring. For example, if 4% is entered, the module determines the calendar date for which there is a 4% probability of the equipment failing prior to this date. By knowing the probability of failure occurring prior to the date, knowledgeable decisions can be made on how long to delay repairing/refurbishing/replacing equipment.

The invention thus provides an interactive failure predictor display that allows the plant staff to interactively perform "what if" scenarios based on any future specified time point (future calendar date) or based on a specified probability that the equipment will fail prior to a calculated calendar date. Thus this invention provides capability that will allow operators and maintenance personnel to fully explore the probability continuum and optimize maintenance and scheduling activities.

What is claimed is:

1. A maintenance display for predicting the optimum date on which components in a system are to be serviced, comprising:

a sensor system for monitoring a parameter indicative or an operating condition of at least one of the components in the system;

an Equipment Failure And Degradation Module that receives an input from the sensor system and from the sensor system input determines if the component monitored in the system is in imminent danger of failing and the predicted remaining component life the monitored component; and a probability of failure predictor module that determines and displays, for a specified date, the probability that a failure in the monitored component will occur prior to the specified date.

2. The maintenance display of claim 1 wherein the Probability-of-Failure Predictor Module determines the probability that a failure in the monitored component will occur prior to the specified date from a failure distribution model for the monitored component developed by the Equipment Failure And Degradation Module.

3. The maintenance display of claim 2 wherein the failure distribution model is based on a Normal Distribution.

4. The maintenance display of claim 1 wherein the Probability-of-Failure Predictor Module determines the probability that a failure in the monitored component will occur prior to the specified date from a combination of probabilities of failure of sub-components of the monitored component.

5. The maintenance display of claim 4 wherein the combination of probabilities is $$P_{system} = P_1 + P_2 + P_3 - (P_1P_2 + P_1P_3 + P_2P_3 - P_1P_2P_3);$$

where $P_{n-1,2,3}$ is the probability of failure for sub-system "n" at time $t=t_3$;

$$P_1 = \int_0^{t_1} f_1(t)$$

$$P_2 = \int_0^{t_1} f_2(t)$$

$$P_3 = \int_0^{t_1} f_3(t)$$

and $f_n(t)$ is a statistical model for the failure distribution for sub-system "n" as a function of time (where time is such that $t=t_0$ represents the time which corresponds to a defined starting point for the failure distribution function (where $f_n(t)$ begins and is essentially zero), and $t=t_1$ represents a point in time greater than $t_0$ [$t_1 > t_0$]).

6. The maintenance display of claim 1 wherein the Probability-of-Failure Predictor Module displays the probability of failure of the monitored component after the specified date.

7. The maintenance display of claim 1 including a Date-of-Failure Predictor Module that determines and displays for a specified probability the date that the monitored component not fail prior to that date.

8. The maintenance display of claim 7 wherein the Date-of-Failure Predictor Module displays the probability of failure of the monitored component after the determined date.

9. A maintenance display for predicting the optimum date on which components in a system are to be serviced, comprising:

a sensor system for monitoring a parameter indicative of an operating condition of at least one of the components in the system;

an equipment failure and degradation module that receives an input from the sensor system and from the sensor system input determines if the component monitored in the system is in imminent danger of failing and the predicted remaining component life of the monitored component; and, a Date-of-Failure Predictor Module that determines and displays, for a specified probability of failure, the date that a failure in the monitored component will likely occur prior to the specified probability.

10. The maintenance display of claim 9 wherein the Date-of-Failure Predictor Module determines the date that a failure in the monitored component will likely occur for the specified probability from a failure distribution model for the monitored component developed by the equipment failure and degradation module.

* * * * *